United States Patent
Mullins et al.

(10) Patent No.: US 10,885,114 B2
(45) Date of Patent: Jan. 5, 2021

(54) DYNAMIC ENTITY MODEL GENERATION FROM GRAPH DATA

(71) Applicant: Microsoft Technology Licensing, LLC, Redmond, WA (US)

(72) Inventors: Christopher L. Mullins, Sammamish, WA (US); Congyong Su, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 669 days.

(21) Appl. No.: 15/344,405

(22) Filed: Nov. 4, 2016

(65) Prior Publication Data
US 2018/0129751 A1 May 10, 2018

(51) Int. Cl.
  *G06F 16/20* (2019.01)
  *G06F 16/901* (2019.01)
  *G06F 16/28* (2019.01)

(52) U.S. Cl.
  CPC ........ *G06F 16/9024* (2019.01); *G06F 16/285* (2019.01); *G06F 16/288* (2019.01)

(58) Field of Classification Search
  None
  See application file for complete search history.

(56) References Cited

U.S. PATENT DOCUMENTS

| | | | |
|---|---|---|---|
| 5,721,943 A | 2/1998 | Johnson | |
| 5,802,529 A * | 9/1998 | Nakatsuyama | G06F 16/93 715/210 |
| 5,910,028 A | 6/1999 | Tsuji | |
| 6,560,592 B1 | 5/2003 | Reid et al. | |
| 6,947,943 B2 | 9/2005 | Deanna et al. | |
| 7,016,880 B1 | 3/2006 | Adams et al. | |
| 7,068,849 B2 | 6/2006 | Zandi et al. | |
| 7,069,335 B1 | 6/2006 | Layman et al. | |
| 7,418,497 B2 | 8/2008 | Hagale et al. | |
| 7,584,208 B2 | 9/2009 | Spivack et al. | |
| 7,668,834 B2 | 2/2010 | McCullough | |
| 7,702,603 B1 | 4/2010 | Hauser | |

(Continued)

FOREIGN PATENT DOCUMENTS

| | | |
|---|---|---|
| CN | 103714129 | 4/2014 |
| CN | 102201041 B | 9/2015 |

(Continued)

OTHER PUBLICATIONS

Jorge, et al., "Post-Processing Operators for Browsing Large Sets of Association Rules", In Proceedings of the 5th Int'l. Conference on Discovery Science, Nov. 24, 2002, 4 pages.

(Continued)

*Primary Examiner* — Jau Shya Meng

(57) ABSTRACT

In the present disclosure, systems, methods and devices for dynamically extending a federated graph are provided. Data may be received in a variety of unrelated forms and one or more classification types may be associated with received data. Relationships that link new data input to existing data sets and their associated classification types may be generated and new data input may be incorporated and stored with existing data sets according to generated data relationships. A data set may be sorted, and resources associated with a data set may be retrieved, based on dynamic query types.

20 Claims, 13 Drawing Sheets

(56) References Cited

U.S. PATENT DOCUMENTS

| | | | |
|---|---|---|---|
| 8,001,551 B2 | 8/2011 | Le Roy et al. | |
| 8,112,377 B2 | 2/2012 | Schmidt | |
| 8,140,362 B2 | 3/2012 | Deshpande et al. | |
| 8,185,558 B1 | 5/2012 | Narayanan et al. | |
| 8,428,981 B2 | 4/2013 | Li et al. | |
| 8,429,179 B1* | 4/2013 | Mirhaji | G06F 16/3344 707/756 |
| 8,443,005 B1 | 5/2013 | Goldman et al. | |
| 8,473,543 B2 | 6/2013 | Tsofi et al. | |
| 8,620,964 B2 | 12/2013 | Tsatsou et al. | |
| 8,739,016 B1 | 5/2014 | Goldman et al. | |
| 8,788,330 B2 | 7/2014 | Leffert | |
| 8,825,711 B2 | 9/2014 | Chan et al. | |
| 8,838,707 B2 | 9/2014 | Lawson et al. | |
| 9,075,873 B2 | 7/2015 | Vanderwende et al. | |
| 9,087,236 B2 | 7/2015 | Dhoolia et al. | |
| 9,301,016 B2 | 3/2016 | Archibong et al. | |
| 9,317,557 B2 | 4/2016 | Shao et al. | |
| 9,336,306 B2 | 5/2016 | McAteer et al. | |
| 9,342,622 B2 | 5/2016 | Segaran | |
| 9,348,880 B1 | 5/2016 | Kramer et al. | |
| 9,367,809 B2 | 6/2016 | Puri et al. | |
| 9,396,046 B2 | 7/2016 | Laredo et al. | |
| 9,400,822 B2 | 7/2016 | Schrock et al. | |
| 2002/0123956 A1 | 9/2002 | Galuten | |
| 2003/0217033 A1 | 11/2003 | Sandler et al. | |
| 2003/0217081 A1 | 11/2003 | White et al. | |
| 2003/0236767 A1* | 12/2003 | Akiyama | G06F 16/78 |
| 2004/0128296 A1* | 7/2004 | Krishnamurthy | G06F 16/284 |
| 2005/0193361 A1 | 9/2005 | Vitanov et al. | |
| 2005/0276479 A1 | 12/2005 | Goldberg et al. | |
| 2005/0278354 A1 | 12/2005 | Gupta et al. | |
| 2006/0155725 A1 | 7/2006 | Foster et al. | |
| 2007/0179995 A1* | 8/2007 | Prahlad | G06F 16/24575 |
| 2007/0282711 A1 | 12/2007 | Ullman et al. | |
| 2008/0082466 A1 | 4/2008 | Meijer et al. | |
| 2008/0140602 A1 | 6/2008 | Roth et al. | |
| 2008/0178164 A1 | 7/2008 | Brown et al. | |
| 2008/0307337 A1* | 12/2008 | Marinkovich | G06F 16/54 715/764 |
| 2009/0024648 A1 | 1/2009 | Heix et al. | |
| 2009/0063559 A1 | 3/2009 | Rhodes et al. | |
| 2009/0070299 A1 | 3/2009 | Parikh et al. | |
| 2009/0089265 A1 | 4/2009 | Saito et al. | |
| 2009/0164416 A1* | 6/2009 | Guha | G06F 16/31 |
| 2009/0187517 A1 | 7/2009 | Mihalkova et al. | |
| 2009/0259944 A1 | 10/2009 | Wu | |
| 2010/0023481 A1 | 1/2010 | Mcgoveran | |
| 2010/0030725 A1 | 2/2010 | Mendis et al. | |
| 2010/0036788 A1 | 2/2010 | Wu et al. | |
| 2010/0082646 A1 | 4/2010 | Meek et al. | |
| 2010/0223223 A1 | 9/2010 | Sandler et al. | |
| 2010/0318488 A1 | 12/2010 | Oliver et al. | |
| 2011/0004702 A1 | 1/2011 | Tsofi et al. | |
| 2012/0185826 A1 | 7/2012 | Wheeler et al. | |
| 2013/0117185 A1 | 5/2013 | Collison et al. | |
| 2013/0238667 A1 | 9/2013 | Carvalho et al. | |
| 2013/0246435 A1 | 9/2013 | Yan et al. | |
| 2014/0046981 A1 | 2/2014 | Adams et al. | |
| 2014/0067850 A1 | 3/2014 | Schrock et al. | |
| 2014/0129504 A1 | 5/2014 | Soon-shiong | |
| 2014/0164298 A1 | 6/2014 | Goranson et al. | |
| 2014/0172914 A1 | 6/2014 | Elnikety et al. | |
| 2014/0279957 A1* | 9/2014 | Moore | G06F 16/9024 707/692 |
| 2014/0330594 A1* | 11/2014 | Roberts | G06Q 40/08 705/4 |
| 2014/0337373 A1 | 11/2014 | Morsi et al. | |
| 2015/0072653 A1 | 3/2015 | Fan et al. | |
| 2015/0128121 A1 | 5/2015 | Garcia | |
| 2015/0242186 A1 | 8/2015 | Yuen et al. | |
| 2015/0242762 A1 | 8/2015 | Cox et al. | |
| 2015/0280999 A1 | 10/2015 | Chart et al. | |
| 2015/0379409 A1 | 12/2015 | Hu et al. | |
| 2016/0055423 A1 | 2/2016 | Buchanan et al. | |
| 2016/0077920 A1 | 3/2016 | Regni et al. | |
| 2016/0149953 A1 | 5/2016 | Hidayat | |
| 2016/0224674 A1 | 8/2016 | Miller et al. | |
| 2016/0275347 A1 | 9/2016 | Sukhodolov et al. | |
| 2016/0301766 A1 | 10/2016 | Ionescu et al. | |
| 2017/0097984 A1 | 4/2017 | Haldar | |
| 2018/0129546 A1 | 5/2018 | Mullins et al. | |
| 2018/0129695 A1 | 5/2018 | Standefer et al. | |
| 2018/0129697 A1 | 5/2018 | Mullins et al. | |
| 2018/0129715 A1 | 5/2018 | Standefer et al. | |
| 2018/0129951 A1 | 5/2018 | Standefer et al. | |

FOREIGN PATENT DOCUMENTS

| | | |
|---|---|---|
| EP | 1681645 | 7/2006 |
| WO | 175679 | 10/2001 |
| WO | 2007048432 | 5/2007 |
| WO | 2015006718 A1 | 1/2015 |

OTHER PUBLICATIONS

PCT International Search Report and Written Opinion Issued in Application No. PCT/US2017/059629, dated Dec. 22, 2017, 14 Pages.

Saygin et al., "Association Rules for Supporting Hoarding in Mobile Computing Environments", In Proceedings of Tenth International Workshop on Research Issues in Data Engineering, Feb. 29, 2000, 2 pages.

Wing, et al., "Smart Retrieval and Sharing of Information Resources Based on Contexts of User-Information Relationships",In the Proceedings of the 19th International Conference on Advanced Information Networking and Applications(AINA), vol. 2, Mar. 25, 2005, 6 Pages.

PCT International Search Report and Written Opinion Issued in Application No. PCT/US2017/059621, dated Jan. 16, 2018, 11 Pages.

"Non Final Office Action Issued in U.S. Appl. No. 15/343,815", dated Dec. 27, 2018, 12 Pages.

"Non Final Office Action Issued in U.S. Appl. No. 15/344,259", dated Jan. 10, 2019, 7 Pages.

"Non Final Office Action Issued in U.S. Appl. No. 15/344,336", dated Jan. 28, 2019, 31 Pages.

"File Versioning Rules", http://web.archive.org/web/20111004024745/http:/msdn.microsoft.com/en-us/library/windows/desktop/aa368599(v=VS.85).aspx, Oct. 4, 2011, 2 pages.

"Keeping previous versions installed when installing CC 2015 applications", https://blogs.adobe.com/creativecloud/keeping-previous-versions-installed-when-installing-cc-2015-applications/, Jun. 15, 2015, 2 pages.

"Receiving API Updates in Real Time with Webhooks", https://developers.facebook.com/docs/graph-api/webhooks, Oct. 12, 2016, 8 pages.

"Subscribe for webhooks to get change notifications", https://msdn.microsoft.com/en-us/office/office365/howto/onenote-sync, May 30, 2016, 3 pages.

"Webhooks", http://web.archive.org/web/20150207190001/https:/developer.github.com/webhooks/, Feb. 7, 2015, 5 pages.

asp.net Dynamic Data, https://web.archive.org/web/20100421030207/http://msdn.microsoft.com/en-us/library/ee845452.aspx, Apr. 21, 2010, 7 pages.

Croitoru, et al., "A Conceptual Graph Based Approach to Ontology Similarity Measure", In Proceedings of 15th International Conference on Conceptual Structures, Jul. 22, 2007, 154-164 pages.

Dynamic model: adding new properties to virtual member manager entities at runtime, http://www.ibm.com/support/knowledgecenter/SSAW57_7.0.0/com.ibm.websphere.wim.doc/dynamicmodeladdingnewpropertiestowimentitiesatruntime.html, Oct. 14, 2016, 2 pages.

Dynamic\ user extensible entities using entity framework, http://stackoverflow.com/questions/15019705/dynamic-user-extensible-entities-using-entity-framework, Retrieved on: Oct. 14, 2016, 4 pages.

Ead, Stephen, "Proof-Theoretic Validity", In Journal of Foundations of Logical Consequence, Apr. 16, 2012, 22 pages.

(56) References Cited

OTHER PUBLICATIONS

Gao, et al., "Ontology-Based Semantic Similarity: A New Approach Based on Analysis of the Concept Intent", In Proceedings of the International Conference on Machine Learning and Cybernetics, Jul. 14, 2013, pp. 676-681.

Gasse, et al., "Rewriting Rules into SROIQ Axioms", In Proceedings of 21st International Workshop on Description Logics, May 13, 2008, 10 pages.

Goedtel, et al., "Azure Automation webhooks", https://azure.microsoft.com/en-us/documentation/articles/automation-webhooks/, Sep. 12, 2016, 12 pages.

Hu, et al., "GMO: A Graph Matching for Ontologies", In Proceedings of the K-CAP Workshop on Integrating Ontologies, Oct. 2, 2005, 8 pages.

Irani, Romin, "How to Integrate Webhooks with the Slack API", http://www.programmableweb.com/news/how-to-integrate-webhooks-slack-api/how-to/2015/10/20, 2015, Oct. 20, 2015, 8 pages.

Leggetter, Phil, "What are WebHooks and How Do They Enable a Real-time Web?", http://www.programmableweb.com/news/what-are-webhooks-and-how-do-they-enable-real-time-web/2012/01/30, Jan. 30, 2012, 5 pages.

Malihi, Ardy, "Entity Framework Dynamic Model Builder", https://github.com/ardymalihi/Dynamix-EntityFramework, Oct. 14, 2016, 3 pages.

Nielsen, Henrik F, "Introducing Microsoft asp.net WebHooks Preview", https://blogs.msdn.microsoft.com/webdev/2015/09/04/introducing-microsoft-asp-net-webhooks-preview/, Sep. 4, 2015, 17 pages.

Omelayenko, et al., "Tracking Changes in RDF(S) Repositories", In Proceedings of the Workshop on Knowledge Transformation for the Semantic Web, Jul. 23, 2012, 121 pages.

Pujara, et al., "Ontology-Aware Partitioning for Knowledge Graph Identification", In Proceedings of the workshop on automated knowledge base construction, Oct. 27, 2013, 5 pages.

Sumurthy, et al., "Working with Webhooks in Microsoft Graph", Oct. 12, 2016, 4 pages.

Thornber, K. K., "A Key to Fuzzy-Logic Inference", In International Journal of Approximate Reasoning, February, Feb. 1993, pp. 105-121.

Vanderlyn, et al., "Similarity in Semantic Graphs: Combining Structural, Literal, and Ontology-based Measures", In Proceedings of Tenth International Conference on Semantic Technology for Intelligence, Defense, and Security, Nov. 18, 2015, pp. 1-8.

Vega, Diego, "Support for "dynamic" entity models", https://github.com/aspnet/EntityFramework/issues/2282, May 28, 2015, 3 pages.

Zhang, et al., "Semantic similarity between ontologies at different scales", In Proceedings of IEEE/CAA Journal of Automatica Sinica, vol. 3, Issue 2, Apr. 10, 2016, pp. 132-140.

"Non Final Office Action Issued in U.S. Appl. No. 15/344,109", dated Oct. 4, 2018, 17 Pages.

"International Search Report and Written Opinion Issued in PCT Application No. PCT/US17/059626", dated May 28, 2018, 16 pages.

"Invitation to Pay Additional Fee Issued in PCT Application No. PCT/US17/059626", Mailed Date: Apr. 3, 2018, 10 Pages.

"Final Office Action Issued in U.S. Appl. No. 15/344,336", dated Aug. 7, 2019, 6 Pages.

"Non Final Office Action Issued in U.S. Appl. No. 15/344,027", dated Jun. 27, 2019, 35 Pages.

"Non Final Office Action Issued in U.S. Appl. No. 15/344,027", dated Dec. 16, 2019, 32 pages.

"Final Office Action Issued in U.S. Appl. No. 15/344,027", dated May 6, 2020, 42 pages.

"Advisory Action Issued in U.S. Appl. No. 15/344,027", dated Aug. 4, 2020, 4 pages.

"Office Action Issued in European Patent Application No. 177980681", dated Sep. 24, 2020, 5 pages.

\* cited by examiner

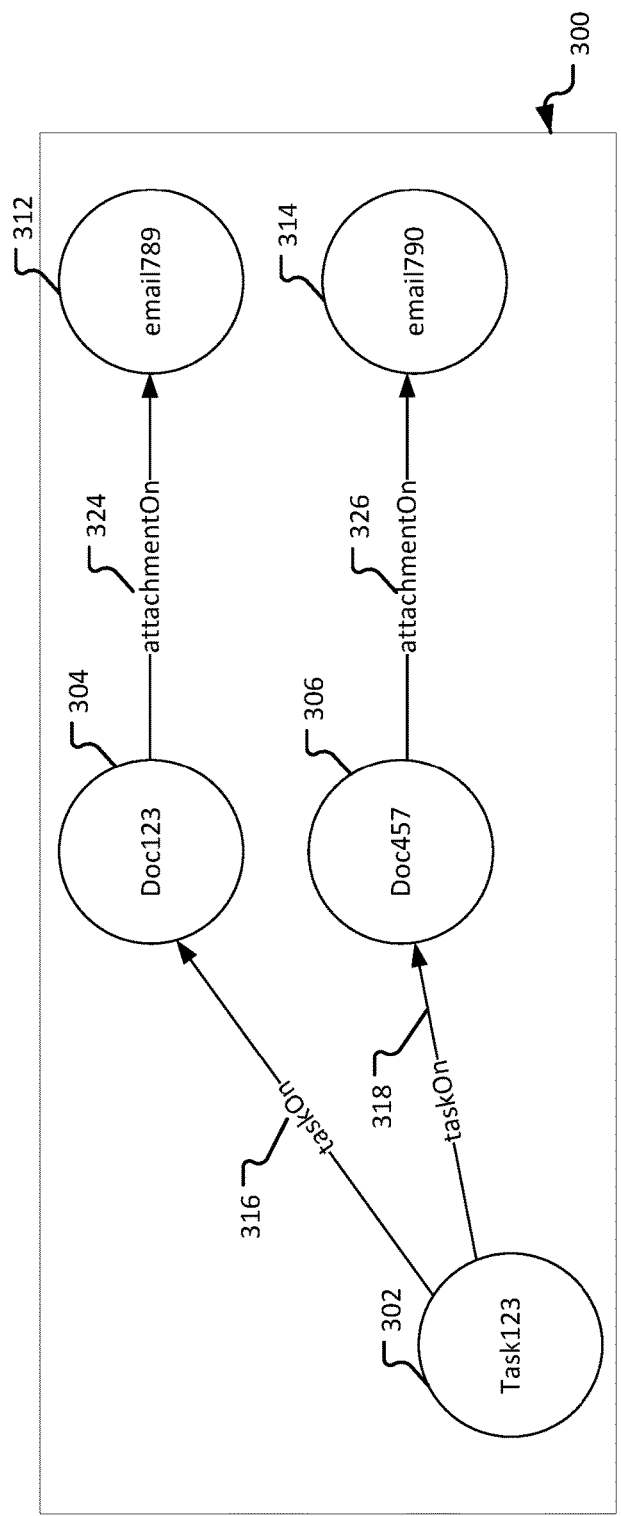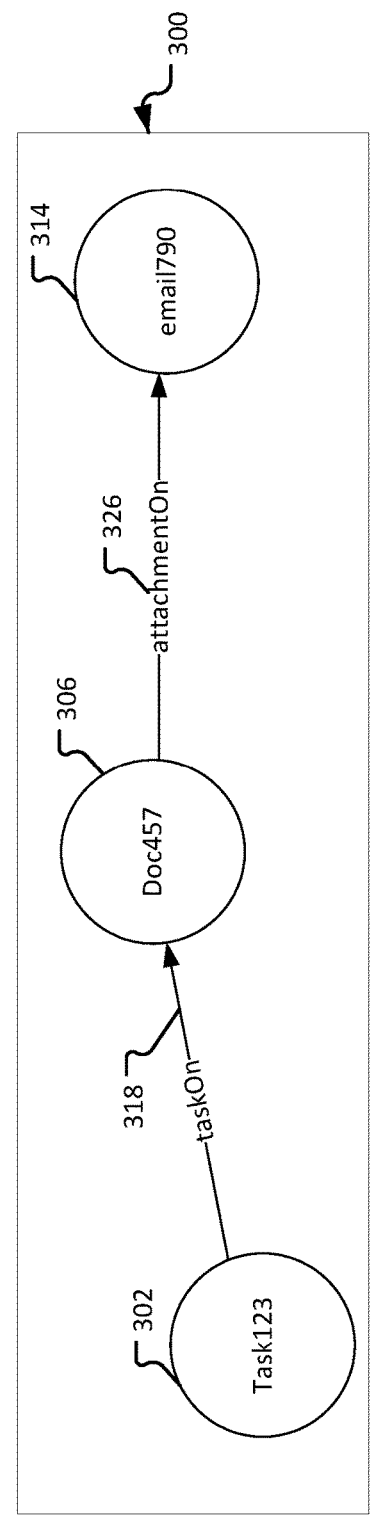
FIG. 3D
FIG. 3E

DYNAMIC ENTITY MODEL GENERATION FROM GRAPH DATA

BACKGROUND

Advances in data analytics utilizing large data repositories composed of data from various sources has been applied to many different fields such as customer relation management, academic research, and targeted advertisement creation, among others. Databases that have typically handled large amounts of collated data are typically stylistically typed based on schema and operate on static data sources that fit specified schema according to the database utilized, the data source, or both.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Non-limiting examples of the present disclosure describe systems, methods and devices for processing data that may be received in a variety of unrelated forms, determining various classification types that may be associated with such data, and generating relationships that link new data input to existing data sets and their associated classification types. Accordingly, aspects of the present disclosure provide mechanisms for receiving and processing data in a "data first" environment and subsequently storing, classifying, sorting and retrieving that data based on one or more classification types that have been associated with received data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following Figures.

FIGS. 3B-3E illustrate an example query model that may be used to travers a collection of nodes within a Set.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of generating and querying isolated collections of resource, or resource identifiers, and the relationships between those resources or resource identifiers. The resources and/or relationships may be provided by a developer or other source. The resources and relationships nay also be inferred by executing a rule set against the isolated collection. Further, access to the isolated collection may be controlled through various techniques to provide additional security measures for the content in each isolated collection. As used herein, an isolated collection may be referred to as a "Set."

Collections of data have traditionally been stored in "schema first" environment, such as relational databases, that require received data to conform to prescribed schema that identify common themes and relationships amongst the data. Such databases are capable of accepting data input in forms that meet their prescribed schema (e.g., data received in forms that encompass the same or similar format) and allow for categorization and sorting of that data by assigning static types to the schema.

Aspects of the current disclosure provide mechanisms for processing data that may be received in a variety of unrelated forms, and determining various classification types that may be associated with such data based on inspection and analysis of that data. Based on associating one or more classification types with inspected data, mechanisms are provided herein for generating relationships that link new data input to existing data sets and their associated classification types. Accordingly, certain aspects of the present disclosure provide systems and methods for receiving and processing data in a "data first" environment and subsequently storing, classifying, sorting and retrieving that data based on one or more classification types that have been associated with that data.

Figure 1:
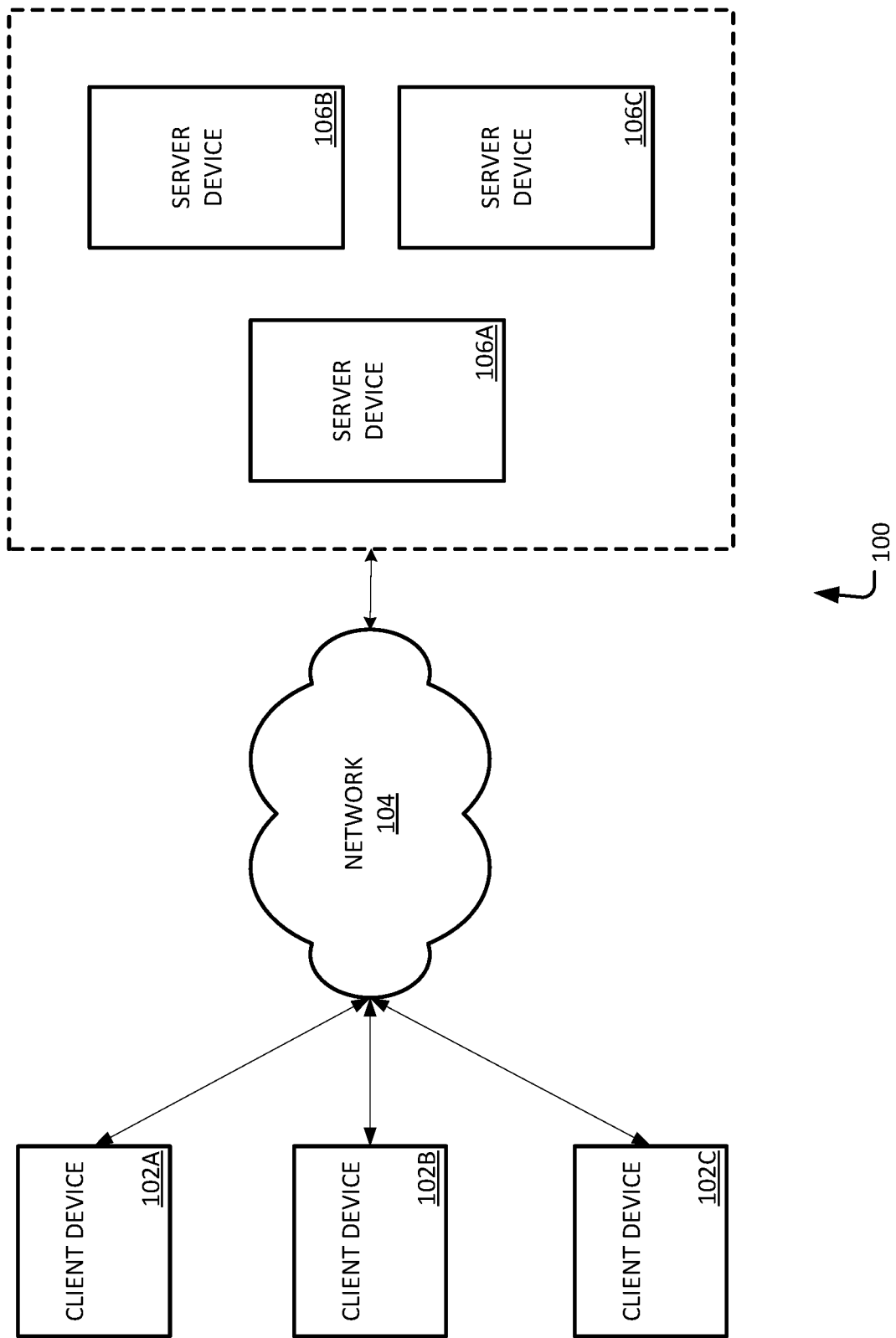
FIG. 1 illustrates an overview of an example system for dynamic entity model generation from graph data.

FIG. 1 illustrates an overview of an example system for dynamic entity model generation from graph data as described herein. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 7-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
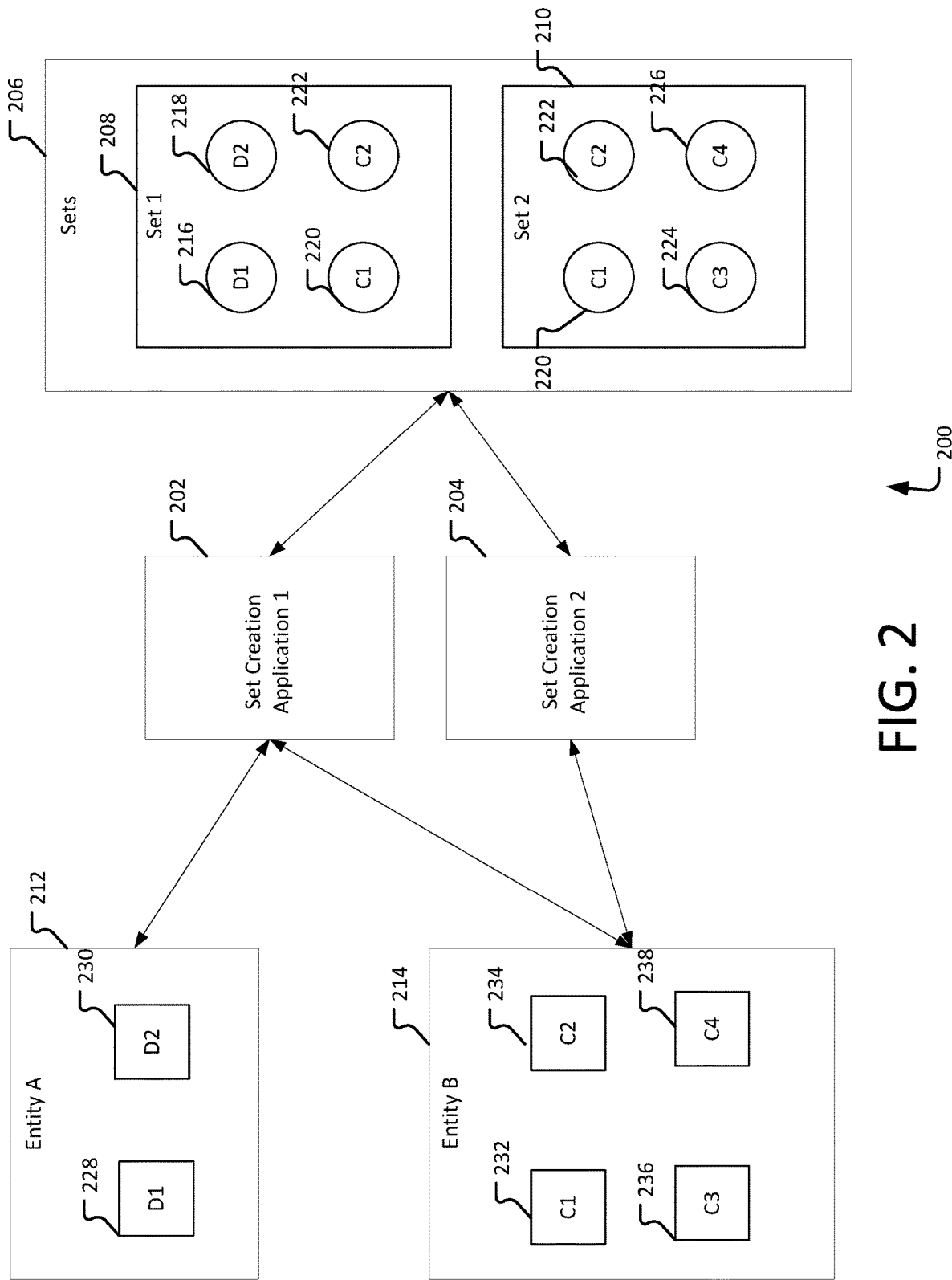
FIG. 2 illustrates an exemplary environment for Set creation from multiple entities having multiple resources.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rule sets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rule sets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
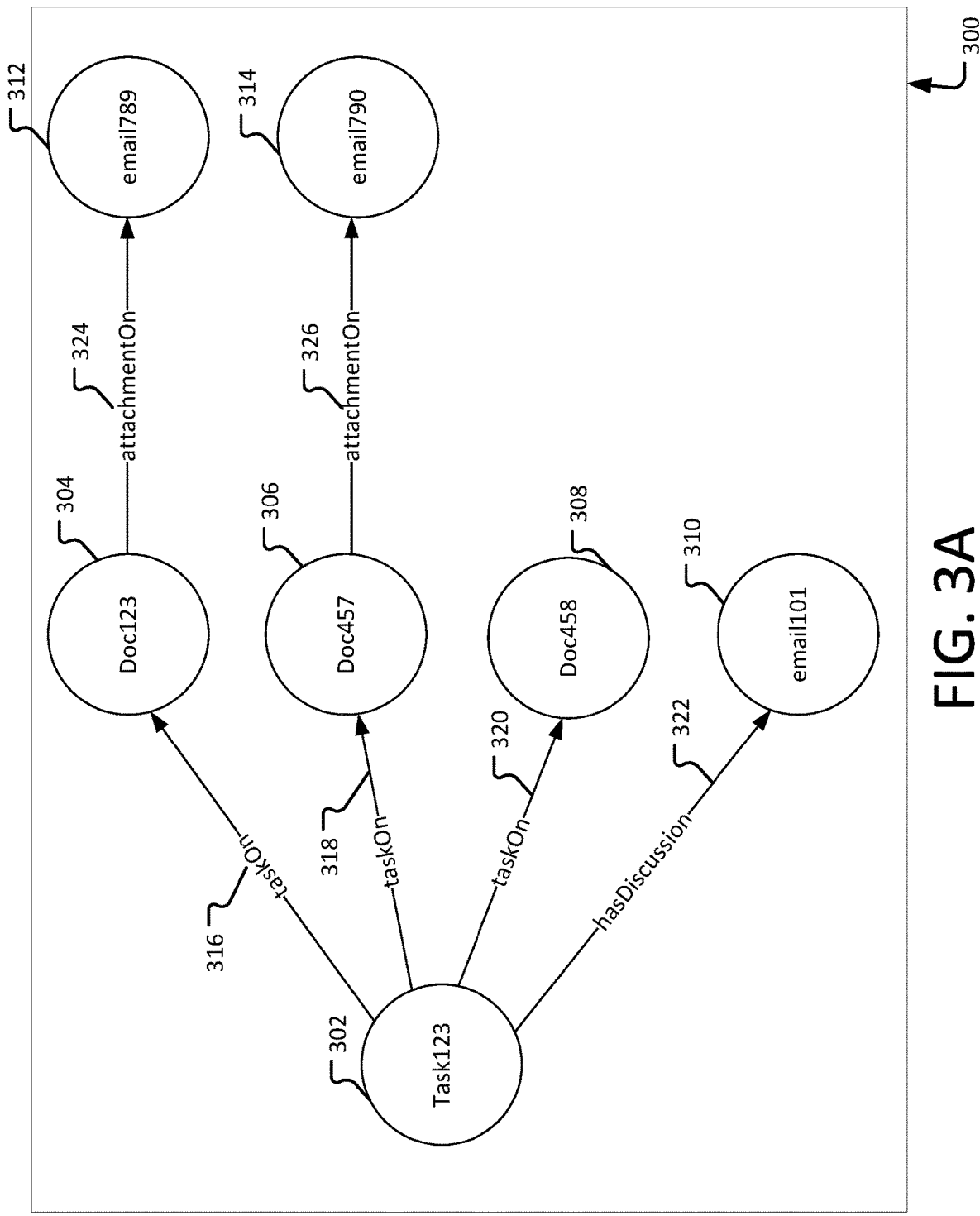
FIG. 3A illustrates an example isolated collection of asserted resource identifiers and corresponding relationships.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rule sets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationship, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figures 3B, 3C:
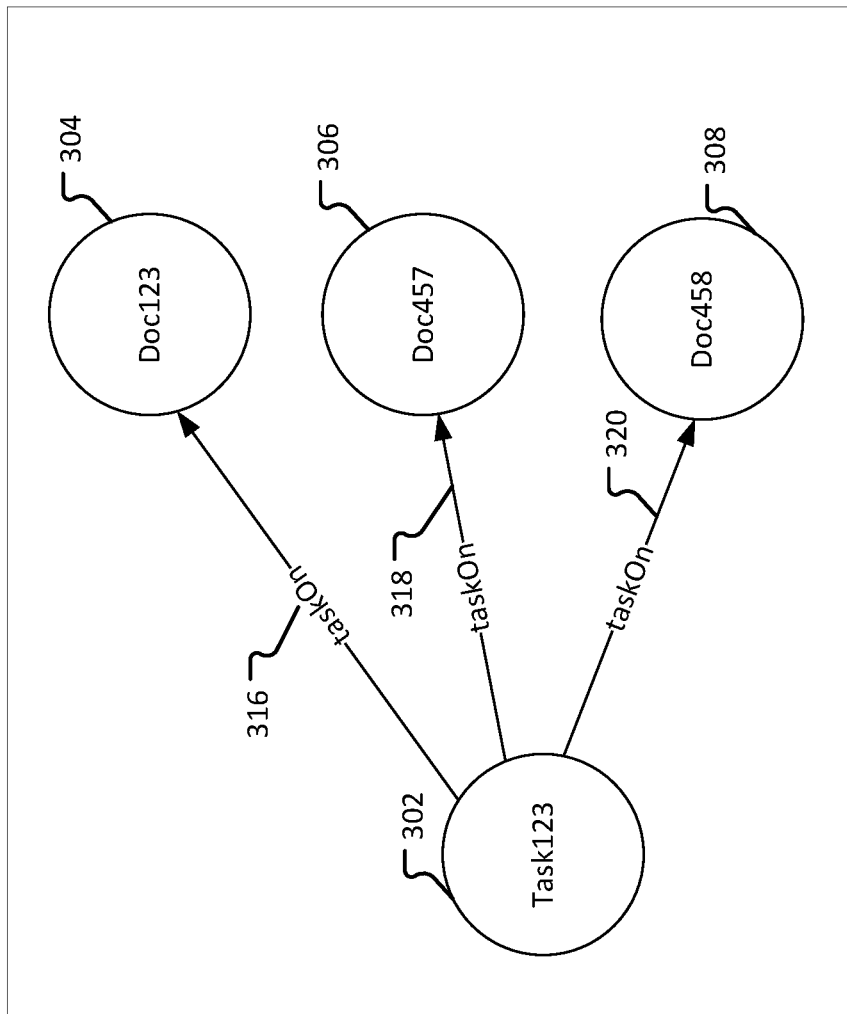

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http:// . . . /collection300/task123?$expand=taskOn ($expand=attachmentOn($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
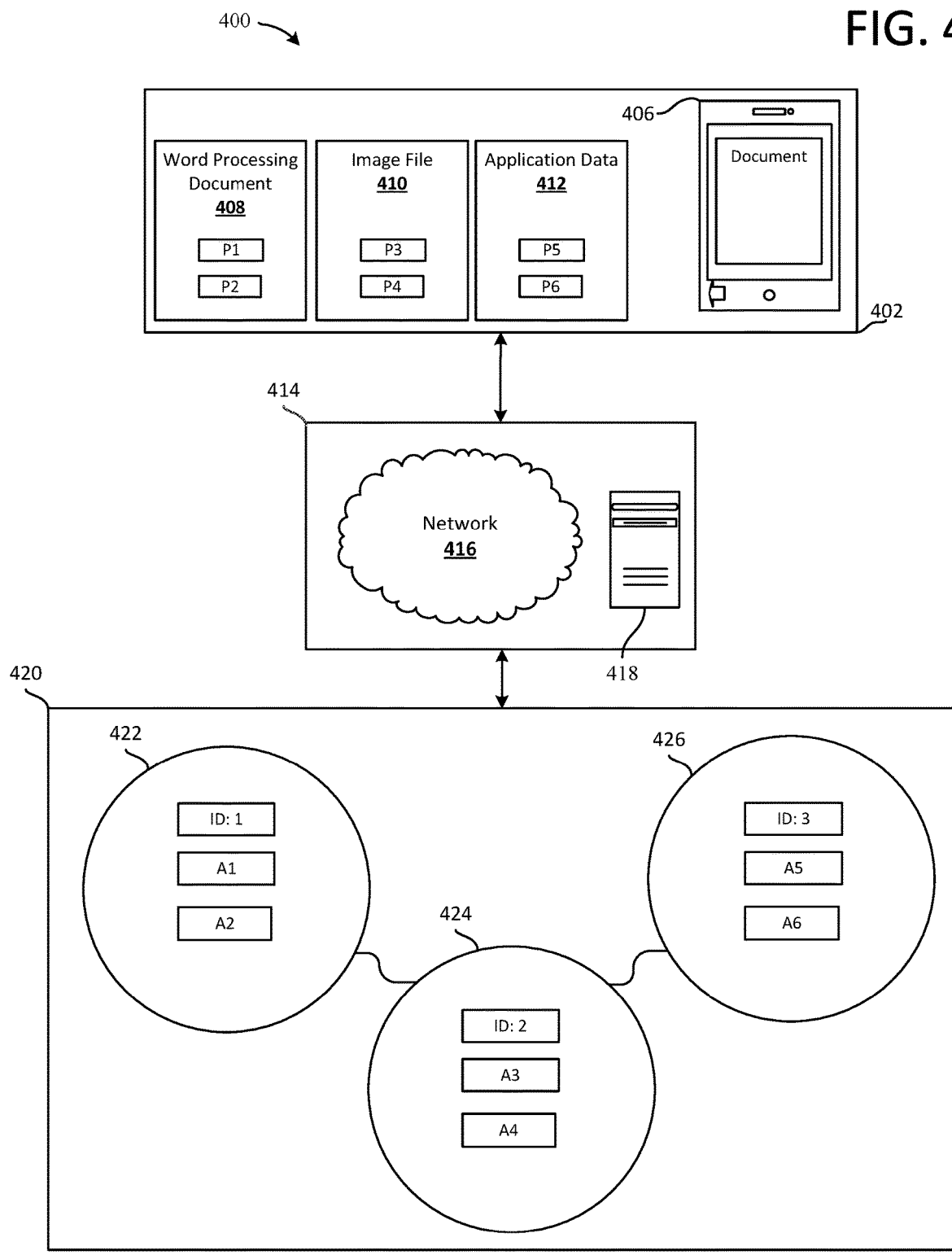
FIG. 4 illustrates an example of node creation and entity attribute type assignment based on resource property analysis.

FIG. 4 illustrates one example of node creation and entity attribute type assignment based on resource property analysis. FIG. 4 includes a collated resource environment 402, which includes exemplary resources 408 (a word processing document), 410 (an image file), and 412 (application data), as well as a computing device 406, which according to aspects may provide exemplary resources 408, 410 and 412 to a property analysis environment 414 via network 416. According to examples, property analysis environment 414 may include one or more computing devices, such as server computing device 418, for inspecting and analyzing resources and their associated properties and determining, based on one or more sets of rules, whether one or more properties associated with exemplary resources 408, 410 and 412 should be categorized into one or more entity attribute types.

FIG. 4 also includes isolated collection 420, derived from exemplary resources 408, 410 and 412, with nodes 422, 424 and 426 having assigned resource identifiers and entity attribute types based on processing performed in property analysis environment 414. Although exemplary resources 408, 410 and 412 are exemplified as being a document, an image file and application data, it should be understood that other data types may be similarly processed by property analysis environment 414 and one or more related isolated collections may likewise be generated for those data types. For example, data types that may be analyzed by property analysis environment 414 and one or more isolated collections created therefrom may include other data types such as audio files, location identification files (e.g., GPS data), contact list data, calendar information data, social media application data, SMS message data, joint messaging application data (including data in exchange formats such as JSON, XML and YAML), etc.

Word processing document 408 includes a first property (P1) and a second property (P2). Accordingly, word processing document 408 may be sent, via network 416, to one or more computing devices, such as server computing device 418, where data from word processing document 408, including first property (P1) and second property (P2) may be analyzed. For example, a document processing engine may perform natural language processing, contextual data analysis and syntax analysis on text, objects and associated metadata related to word processing document 408, and a determination may be made based on such data processing whether to assign first property (P1) and/or second property (P2) to one or more entity attribute types for a node that represents word processing document 408 (e.g., the resource). Alternatively, information, such as metadata, about a resource, such as word processing document 408, may be sent via the network. The information may then be processed to determine one or more properties about the resource. Additionally, as discussed above with regard to FIG. 2, one or more computing devices associated with property analysis environment 414 may assign a resource identifier to word processing document 408 in the creation of a corresponding node for word processing document 408.

According to examples, a document processing engine may analyze first property (P1) of word processing document 408 and make a determination based on that analysis and one or more sets of rules that first property (P1), such as a company name in a signature line of the word document, should be classified in a "Company Name" entity attribute type during generation of a node for word processing document 408. Similarly, a document processing engine may analyze second property (P2) of word processing document 408 and make a determination based on that analysis and one or more rule sets that second property (P2), such as a first and last name on a signature line, should be classified in a "Person Name" entity attribute type during generation of a node for word processing document. Thus, when node 422 is generated for isolated collection 420 based on analysis of word processing document 408, a resource identifier (e.g., "ID: 1") is associated with node 422 such that the resource identifier may correspond to, and/or identify, the location of word processing document 408. Additionally, when node 422 is generated for isolated collection 420 based on analysis of word processing document 408, a first attribute (e.g., "A1") is associated with node 422 indicating that word processing document 408 contains at least one property that has been classified as an entity attribute type "Company Name." Likewise, when node 422 is generated for isolated collection 420 based on analysis of word processing document 408, a second attribute ("A2") is associated with node 422 indicating that word processing document 408 contains at least one property that has been classified as an entity attribute type "Task 1."

Turning back to FIG. 4, image file 410 includes a first property (P3) and a second property (P4). Accordingly, image file 410 may be sent, via network 416, to one or more computing devices, such as server computing device 418, where data from image file 410, including first property (P3) and second property (P4) may be analyzed. For example, an image processing engine may perform, optical character recognition analysis, pattern and gradient matching analysis, facial recognition analysis, etc. related to image file 410, and a determination may be made based on such data processing whether to assign first property (P3) and/or second property (P4) to one or more entity attribute types for a node that represents image file 410 (e.g., the resource). Additionally, as discussed above with regard to FIG. 2, one or more computing devices associated with property analysis environment 414 may assign a resource identifier to image file 410 in the creation of a corresponding node for image file 410.

According to examples, an image processing engine may analyze first property (P3) of image file 410 and make a determination based on that analysis and one or more sets of rules that first property (P3), such as an identified individual based on facial recognition analysis, should be classified in a "Person Name" entity attribute type during generation of a node for image file 410. Similarly, a document processing engine may analyze second property (P4) of image file 410 and make a determination based on that analysis and one or more rule sets that second property (P4), such as a location identified by location recognition analysis, should be classified in a "Specified Location" entity attribute type during generation of a node for image file 410. Thus, when node 424 is generated for isolated collection 420 based on analysis of image file 410, a resource identifier ("ID: 2") is associated with node 424 such that the resource identifier may correspond to, and/or identify, the location of image file 410. Additionally, when node 424 is generated for isolated collection 420 based on analysis of image file 410, a first attribute ("A3") is associated with node 424 indicating that image file 410 contains at least one property that has been classified as an entity attribute type "Person Name." Likewise, when node 424 is generated for isolated collection 420 based on analysis of image file 410, a second attribute ("A4") is associated with node 424 indicating that image file 410 contains at least one property that has been classified as an entity attribute type "Specific Location."

Similarly, application data 412 includes a first property (P5) and a second property (P6). Accordingly, application data 412 may be sent, via network 416, to one or more computing devices, such as server computing device 418, where data from application data 412, including first property (P5) and second property (P6) may be analyzed. For example, an application data processing engine may perform various analyses based on the format of the application data contained in application data 412, and a determination may be made based on such data processing whether to assign first property (P5) and/or second property (P6) to one or more entity attribute types for a node that represents application data 412 (e.g., the resource). Additionally, as discussed above with regard to FIG. 2, one or more computing devices associated with property analysis environment 414 may assign a resource identifier to application data 412 in the creation of a corresponding node for application data 412.

According to examples, an application data processing engine may analyze first property (P5) of application data 412 and make a determination based on that analysis and one or more sets of rules that first property (P5), such as an identified job title for a person associated with a content sharing application, should be classified in a "Job Title" entity attribute type during generation of a node for application data 412. Similarly, an application data processing engine may analyze second property (P6) of application data 412 and make a determination based on that analysis and one or more rule sets that second property (P6), such as a company name associated with the identified job title for the person associated with the content sharing application, should be classified in a "Company Name" entity attribute type during generation of a node for application data 412. Thus, when node 426 is generated for isolated collection 420 based on analysis of application data 412, a resource identifier ("ID: 3") is associated with node 426 such that the resource identifier may correspond to, and/or identify, the location of application data 412. Additionally, when node 426 is generated for isolated collection 420 based on analysis of application data 412, a first attribute ("A5") is associated with node 426 indicating that application data 412 contains at least one property that has been classified as an entity attribute type "Job Title." Likewise, when node 426 is generated for isolated collection 420 based on analysis of application data 412, a second attribute ("A6") is associated with node 426 indicating that application data 412 contains at least one property that has been classified as an entity attribute type "Company Name."

Various conventions may be utilized for generating nodes and corresponding entity attribute types for resources. For example, a convention-based builder for an exemplary resource such as word processing document 408 may be provided such as:
{"id": 1,
"person name": "Laozi",
"company name": [
{"id": 100}]}

Should further processing of word processing document 408 by a document processing engine determine that the identified person in word processing document 408 (i.e., Laozi) has multiple properties associated with three companies, a convention-based builder may be provided such as:
{"id": 1,
"person name": "Laozi",
"company name": [
{"id": 100},
{"id": 102},
{"id": 104}]}

According to further examples, a query input such as "node GetProperties(id)" may allow a user to obtain resource results for a given ID in the query that returns all entity attribute types assigned to the node corresponding to the ID. A query input such as "string[ ] GetRelationships (id)" may allow a user to obtain resource results corresponding to all immediate relationships relating to a node for a given ID. A query input such as "long[ ] GetRelated (id, relationship)" may allow a user to obtain resource results corresponding to all immediate node identifiers that meet the input query relationship, and a query input such as "bool Exists(id)" may allow a user to check whether a node with the input query ID exists.

Entity attribute types generated in property analysis environment 414, which are associated with nodes corresponding to their respective resources via a resource identifier, provide a mechanism for connecting resources within an isolated collection via inter-node relationships based on shared or related entity attribute types. Thus entity attribute types associated with one or more nodes allow for processing of dynamic query types amongst an isolated collection based on relationships of nodes according to their respective determined entity attribute types. Various queries may take advantage of entity attribute types with degrees of flexibility.

Figure 5:
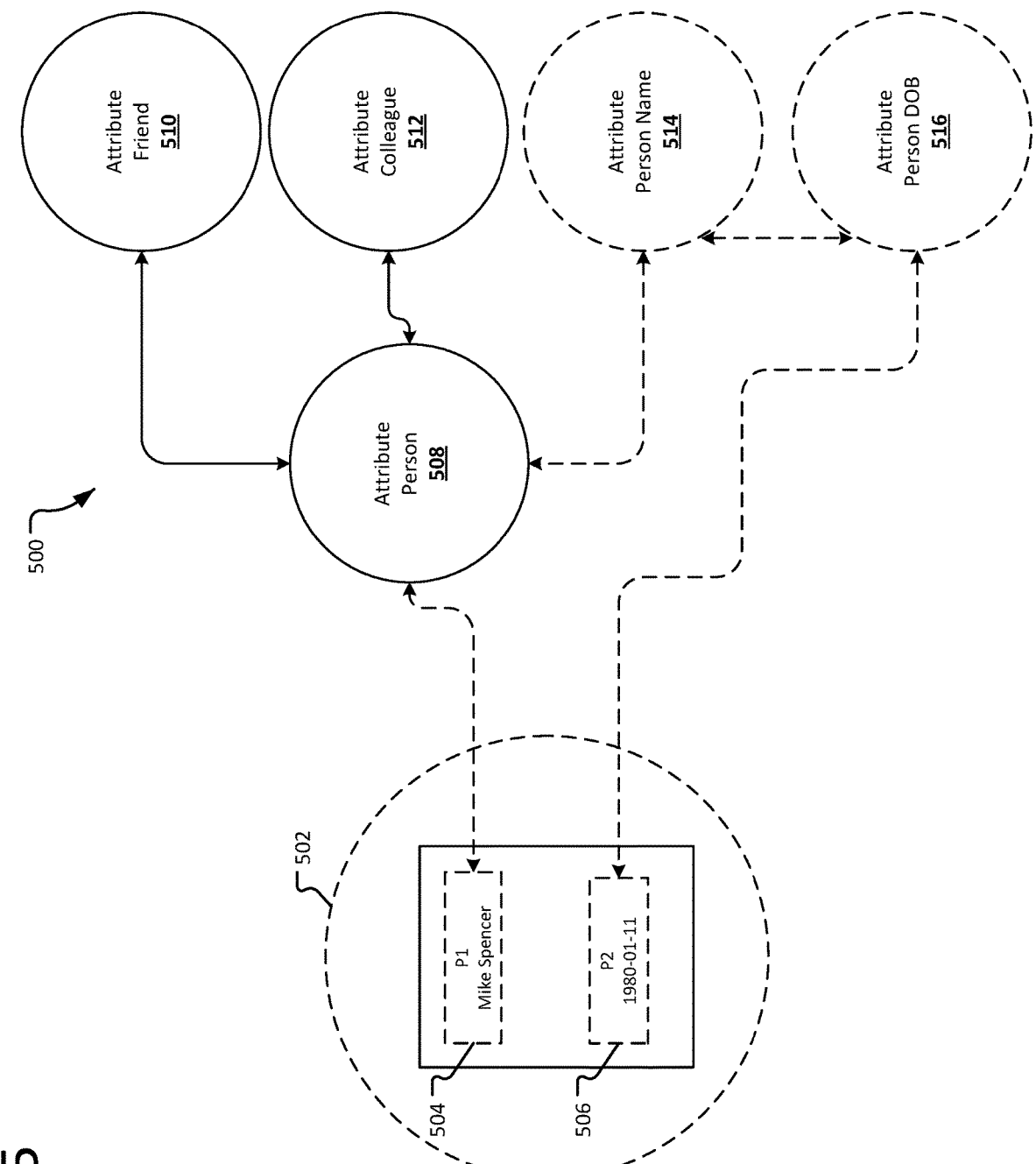
FIG. 5 illustrates an example of node and associated entity attribute type assignment from new resource analysis and entity attribute type expansion within an existing Set.

FIG. 5 illustrates one example of node and associated entity attribute type assignment from new resource analysis and entity attribute type expansion within an existing isolated collection. According to this example, a new resource 502 has been identified. New resource 502 includes a first property 504 and a second property 506. New resource 502 may comprise a document, an image, video, audio, or any other means of communicating data. As a simplified example, new resource 502 may comprise a scanned document that has been run through optical character recognition software and provided to one or more computing devices associated with existing isolated collection 500, which includes collated nodes having existing entity attribute type "Person" 508, collated nodes having existing attribute type "Friend" 510, and collated nodes having existing entity attribute type "Colleague" 512. Specifically, collated nodes having existing entity attribute type "Person" 508 may comprise one or more nodes in existing isolated collection 500, each of which have been determined to have a "Person" property in their respective resource. Collated nodes having existing entity attribute type "Friend" 510 may comprise one or more nodes in existing isolated collection 500, each of which have been determined to have a "Friend" property in their respective resource. Collated nodes having existing entity attribute type "Colleague" 512 may comprise one or more nodes in existing isolated collection 500, each of which have been determined to have a "Colleague" property in their respective resource. Thus, the categorization of nodes by entity attribute type (e.g., "Person", "Friend", "Colleague", etc.) provides support for various dynamic query types within an existing isolated collection, such as existing isolated collection 500. For example, a user may query existing isolated collection 500 to return resources based on nodes having various entity attribute types as discussed with regard to FIGS. 3A-3E.

When a new resource is identified or otherwise added to an existing isolated collection (a new isolated collection is created based on processing of a new resource) the systems and methods described herein inspect the resource, analyze the properties of that resource and determine what entity attributes to assign to that resource such that the resource can support various attribute-type queries. For example, upon identifying new resource 502 a first determination may be made as to the type of data input that corresponds to new resource 502. In this example a determination may be made that new resource 502 comprises a scanned document that has been run through optical character recognition software and the data in resource 502 may be analyzed based on the type of data input. For example, a document analysis engine may be provided in accordance with the systems and methods described herein for determining one or more properties associated with new resource 502 that may be related to one or more existing entity attribute types in existing isolated collection 500. The document analysis engine may make such a determination by analyzing text, images and/or embedded objects contained in new resource 502 in addition to the syntax and context of the text, images and/or embedded objects contained in new resource 502. The document analysis engine may utilize natural language processing and machine learning in performing its property analysis and entity attribute type categorization.

One or more sets of rules may be associated with existing isolated collection 500 for identifying, classifying and creating relationships amongst nodes based on determined entity attribute types from new data input, such as new resource 502. For example, a base classification model comprising one or more sets of rules associated with existing isolated collection 500 may be applied to determine entity attribute types and create searchable relationships amongst nodes. According to another example a set of rules may be customized by a user for determining attribute types and creating new searchable relationships in an isolated collection (e.g., a user may provide a rule that any new document that is determined to have an attachment is to be classified as an email within an existing isolated collection such as existing isolated collection 500).

Although new resource 502 is described as a document (and specifically a document that has been run through optical character recognition) for ease of explanation, it should be understood that other data input types may be provided to an existing isolated collection and corresponding engines may be implemented for inspecting and analyzing those data inputs (e.g., video files, audio files, image files, emails, application data input, etc.) and determining whether one or more properties associated with those data inputs/resources should be assigned to one or more classes of attribute types (e.g., "Person", "Friend", "Colleague", etc.).

Turning back to new resource 502, a determination may be made that first property 504 from new resource 502 is a person's name (i.e., "Mike Spencer"). Such a determination may be made based on the one or more sets of rules as discussed above. For example, a determination may be made that a specific person (e.g., "Mike Spencer") is associated with the document based on the context of the document (e.g., text in the document corresponding to a compound name format), the organization of text and other objects in the document (e.g., a name being recognized in a signature line in the document) and/or a specific person's name being embedded or attached in metadata of the document, etc.

Similarly, a determination may be made that second property 506 from new resource 502 is a date of birth based on one or more sets of rules as discussed above. Thus, the document analysis engine may determine based on, for example, the format and syntax of numbers associated with new resource 502, that, given one or more sets of rules associated with existing isolated collection 500, the numbers correspond to a date, and specifically a date of birth for a person (i.e., Mike Spencer). For example, the document analysis engine may make a determination that the first property 504 ("Mike Spencer") and the second property 506 ("1980-01-11") appear near text in the document such as "DOB." Thus, contextual analysis performed by the document analysis engine may make a determination that the numbers for property 506 are likely to correspond to "Mike Spencer's" date of birth.

Based on the new resource analysis described above and a determination by the document analysis engine that first property 504 corresponds to a specific person's name ("Mike Spencer"), and that second property 506 corresponds to the specific person's date of birth ("1980-01-11"), one or more new nodes corresponding to the new resource 502 may be provided to existing isolated collection 500 for inclusion within existing isolated collection 500. Additionally, while the "Friend," "Person" and "Colleague" entity attribute types already exist in existing isolated collection 500, one or more new entity attribute types may be created and associated with the one or more new nodes corresponding to new resource 502 within existing isolated collection 500 based on the inclusion of the one or more new nodes. Thus, based on the inclusion of new resource 502 in existing isolated collection 500, new query types are supported based on newly created entity attribute types (e.g., "Person Name" and "DOB").

According to this example, new entity attribute types "Person Name" 514 and "Person DOB" 516 have been added to existing isolated collection 500. Specifically, a newly created node based on inclusion of new resource 502 into existing isolated collection 500 may comprise new searchable identifiers (e.g., unique entity attribute type identifiers) for "Person Name" 514 and "Person DOB" 516, which may be associated with other node attribute type relationships within existing isolated collection 500. Thus, by expanding the existing entity attribute types in an isolated collection, new relationships are created within the isolated collection which may aid in the type of searches that are supported by the isolated collection, enhancing the ability to obtain relevant information therefrom.

While FIG. 5 has been described with regard an existing Isolated collection and the generation of new entity attribute types for incorporation into an existing Isolated collection, a new Isolated collection altogether (and corresponding new entity attribute types) may also be generated in accordance with the discussion above. For example, a new Isolated collection may be generated entirely based on analysis of a new resource (such as new resource 502). According to this example, a new Isolated collection may be generated comprising a single node associated with entity attributes "Person," "Person Name" and "Person DOB."

Figure 6:
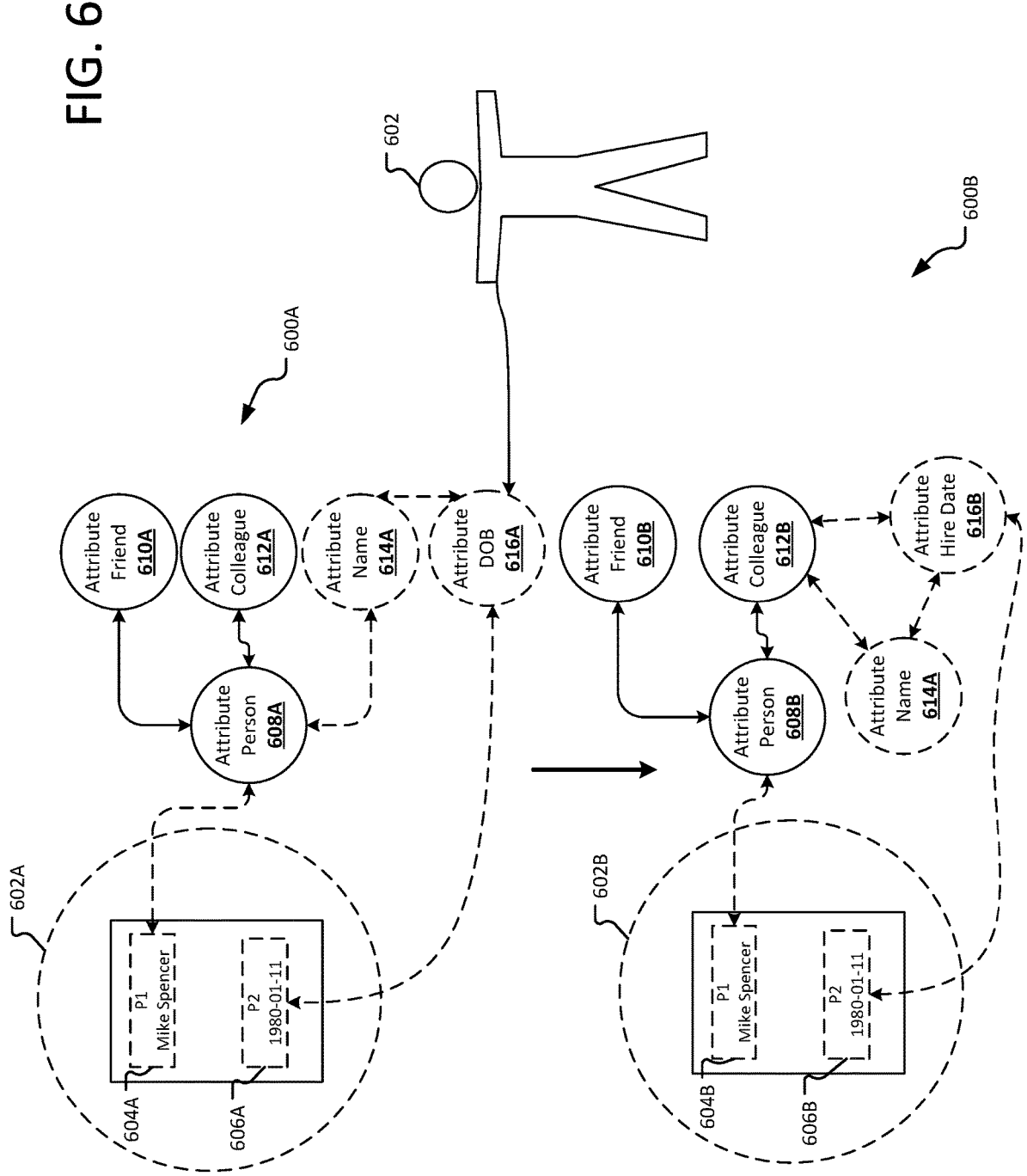
FIG. 6 illustrates entity attribute type assignment in a Set and reassignment in the Set based on corrective user input.

FIG. 6 illustrates exemplary environment 600A for entity attribute type assignment based on analysis of a new resource, and exemplary environment 600B for entity attribute assignment modification based on user input. In environment 600A a new resource 602A has been inspected and analysis has been performed for node and entity attribute type assignment and inclusion into an existing Isolated collection (e.g., an existing isolated collection including existing entity attribute types 608A, 610A and 612A) according to the systems and methods described herein. Based on inspecting and analyzing new resource 602A a determination may be made that a first property 604A associated with new resource 602A corresponds to a person's name (i.e., "Mike Spencer") and that a second property 606A associated with new resource 602A corresponds to a specific person's (i.e., "Mike Spencer") date of birth.

First property 604A and second property 606A associated with new resource 602A may be categorized by one or more data processing engines (e.g., a document processing engine, an image processing engine, a video processing engine, an audio processing engine, etc.). The one or more data processing engines may then apply one or more predefined sets of rules to the first and second properties 604A and 606A based on that analysis. For example, if new resource 602A comprises an email or a document that has undergone optical character recognition, context of text and other objects within or associated with such an email or document may be inspected and analyzed and determinations may be made based on one or more sets of rules that one instance of text associated with a first property 604A likely corresponds to a person name (e.g., "Mike Spencer").

Given the above-described analysis of new resource 602A and corresponding determinations based on one or more predefined sets of rules, a new entity attribute type may be associated with a new node corresponding to new resource 602A and incorporated into an existing isolated collection. For example, a data analysis engine may analyze first property 604A and determine that the text "Mike Spencer" in new resource 602A corresponds to a new entity attribute type ("Name"), and that the group of numbers "1980-01-11" in new resource 602A correspond to a new entity attribute type "DOB." Upon making such determinations new entity attribute types 614A "Name" and 616B "DOB" may be created and associated with a new node associated with new resource 602A and incorporated (via searchable node relationships) to existing nodes (and their corresponding entity attribute types) within an existing isolated collection.

Although a new isolated collection of nodes (and associated entity attribute types) may be configured based on inspection and analysis of a new resource and classifying properties of that resource according to one or more sets of predefined rules, a user such as user 602 may determine that one or more properties related to a new resource have been incorrectly associated with an entity attribute type. In such a case, a user may provide corrective input such that the one or more incorrectly classified properties may be reclassified correctly, and the entity attribute types that have been incorrectly associated with a new node (as well as the relationships within an isolated collection that have been subsequently incorrectly created) may be reconfigured according to the corrective user input.

Exemplary environment 600B illustrates one example of reconfiguration of entity attribute type assignment based on analysis of a new resource 602A/602B and subsequent corrective user input. For example, user 602 may determine that second property 606A of new resource 602A has been improperly classified as a date of birth and provide input, via one or more computing devices associated with system 600A, such that proper entity attribute assignment and incorporation of resource 604A into an existing isolated collection may be made. In this example, user 602 has provided input indicating that second property 606A of new resource 602A has been incorrectly classified as a date of birth and that second property 606A of new resource 602A should be classified as a hire date for a specific person. System 600B illustrates the effect that reclassification of second property 606B of new resource 606B has on an existing Isolated collection.

Upon receiving the corrective input, rather than associating new resource 602A/602B with entity attribute type 616A "DOB" and entity attribute type 614A "Name" and further associating new resource 602A/602B with existing entity attribute type 608A "Person," a new group of entity attribute associations may be created for new resource 602A/602B and the relationships among nodes and their existing entity attribute types have been reconfigured. That is, new entity attribute type 616B "Hire Date" has been created and associated with new resource 602A/602B and new entity attribute type 614B "Name" has been created and associated with new resource 602A/502B, with both of new entity attribute types 614B and 616B associated (via a searchable isolated collection relationships) with nodes classified with existing entity attribute type 612B "Colleague."

In receiving corrective user input an isolated collection may be configured by a user to provide accurate and most relevant content to the user based on queries that utilize one or more entity attribute type limitations. For example, with regard to system 602A (i.e., before receiving corrective input), a query defining hire dates as a query limitation would return zero results (e.g., no nodes are associated with an entity attribute type "Hire Date"). With regard to environment 602A (i.e., before receiving corrective input), a query having a "Name" limitation would return at least one result/resource (e.g., new resource 602A with property 604A ("Mike Spencer") classified as entity attribute type "Name"). In contrast, after receiving corrective user input, a group of query results could be obtained related to a "Hire Date" limitation in a query. Specifically, a "Hire Date" limitation could be created such that nodes/resources associated with entity attribute type 616B "Hire Date" would be provided as results.

The scenarios illustrated with regard to FIG. 6 provide one example of how query types supported by an isolated collection may be affected by corrective user input. With reference to the disclosure it should be understood that various other modifications in query support may be provided by way of corrective user input (e.g., modification of one or more entity attribute type node classification in the isolated collections depicted in FIGS. 3A-3E may affect the type of queries that can be supported by such isolated collections).

Machine learning may be utilized for enhancing future entity attribute assignment based on corrective user input. For example, with reference to FIG. 6, upon receiving corrective user input relating to the group of numbers "1980-01-11" representing a hire date rather than a date of birth, subsequent number strings in the same or similar format and/or number strings as they are represented contextually in a data source which are similar to the way they were represented contextually in new resource 602A/602B may be classified as a "Hire Date" entity attribute type. Thus, machine learning can be used to supplement one or more set of rules when determining what entity attribute types to assign to one or more resource properties.

Figure 7:
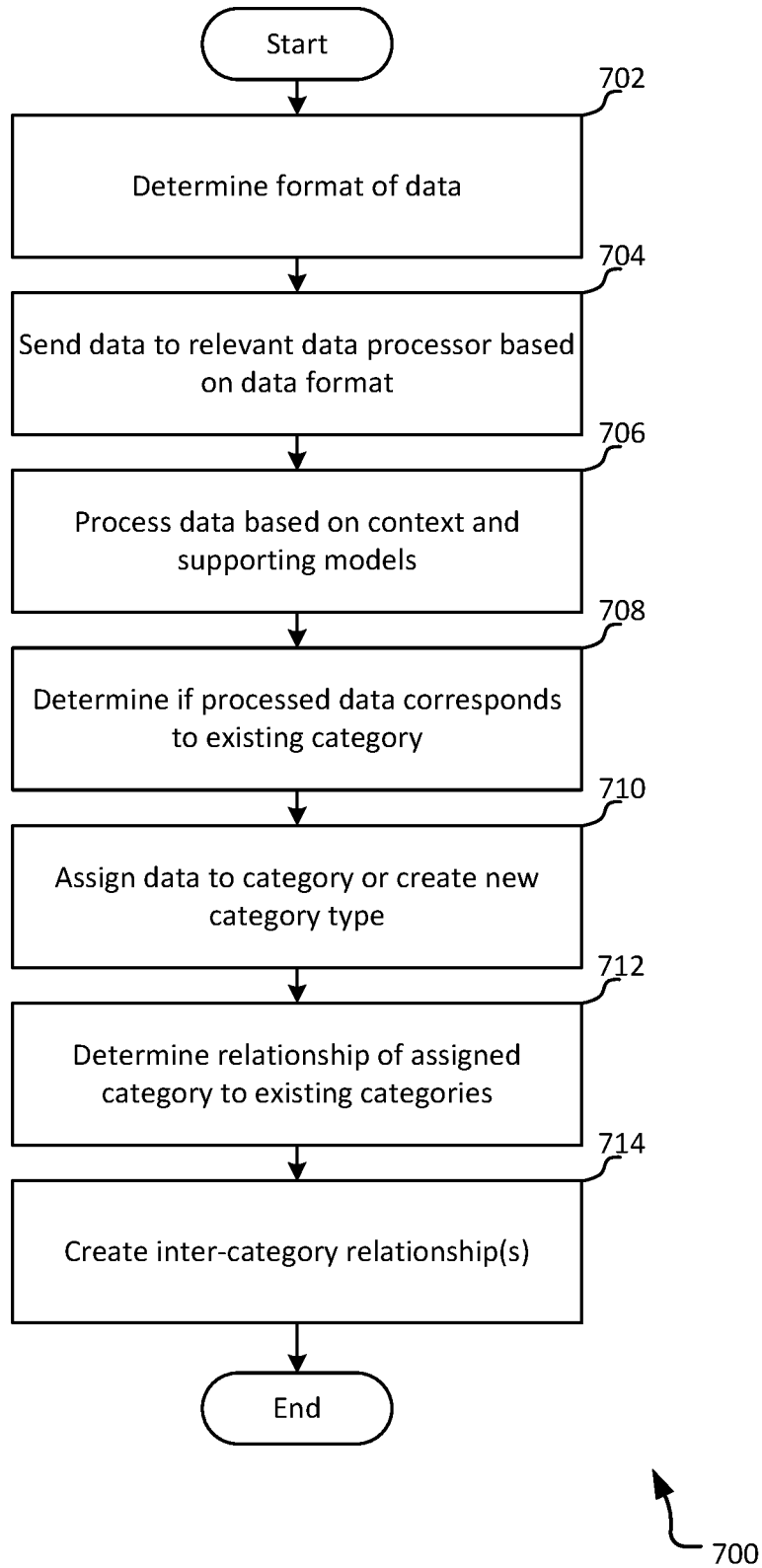
FIG. 7 illustrates an exemplary method for dynamically extending entity attribute types in a Set based on resource analysis and processing

FIG. 7 illustrates an exemplary method 700 for dynamically extending entity attribute types in an isolated collection based on resource analysis and processing. Method 700 begins operation 702 where a format of data from a resource is determined. Specifically, a format such as a word processing document, a slide show document, a video file, an audio file, an image file, an application data file or files, etc. may be determined at operation 702. In examples, information about the resource or the resource itself may be analyzed to determine a format. From operation 702, flow continues to operation 704 where data from the resource is sent to one or more relevant data processing engines based on a determined data format for the resource. For example, if the format of the resource is determined to be a word processing document or a slide show document the data from the resource may be sent to a document processing engine.

From operation 704 flow continues to operation 706 where data from the resources is processed based on one or more supporting models. For example, if the format of the resource is determined to be a word processing document, the document processing engine may utilize natural language processing, contextual analysis, and syntax analysis and one or more sets of corresponding rules in processing the data received from the resource (i.e., the word processing document). Different types of rules may be employed by different processing engines based upon a resource type. That is, different sets of processing rules may be employed depending on the types of information From operation 706 flow continues to operation 708 where a determination is made as to whether one or more properties identified by a corresponding data processing engine corresponds to an existing entity attribute type of an isolated collection.

From operation 708 flow continues to operation 710 where data from the resource corresponding to an identified property is assigned to an existing entity attribute type of an isolated collection or a new entity attribute type. Upon assignment of the data from the resource to an entity attribute type of an isolated collection at operation 710 flow continues to operation 712 where a determination is made as to the relationship of the assigned entity attribute type for the resource to one or more existing nodes in the isolated collection based on their associated assigned entity attribute types.

Moving to operation 714, based on a determination that one or more assigned entity attribute types for the resource are related to one or more existing attribute types for existing nodes in the isolated collection, inter-category relationships are generated for a newly generated node corresponding to the resource and the related existing attribute types for existing nodes in the Isolated collection. According to examples, upon assigning the data from the resource to an entity attribute type and generating inter-category relationships for a newly created node, a user may determine that an incorrect assignment of that data has occurred. As such, a user may provide corrective input such that one or more incorrectly classified properties may be classified correctly, and the entity attribute types that have been incorrectly associated with the new node (as well as the relationships within an isolated collection that have been subsequently incorrectly created) may be configured according to the corrective user input. From operation 714 flow continues to a stop operation and the method 700 ends.

Figure 8:
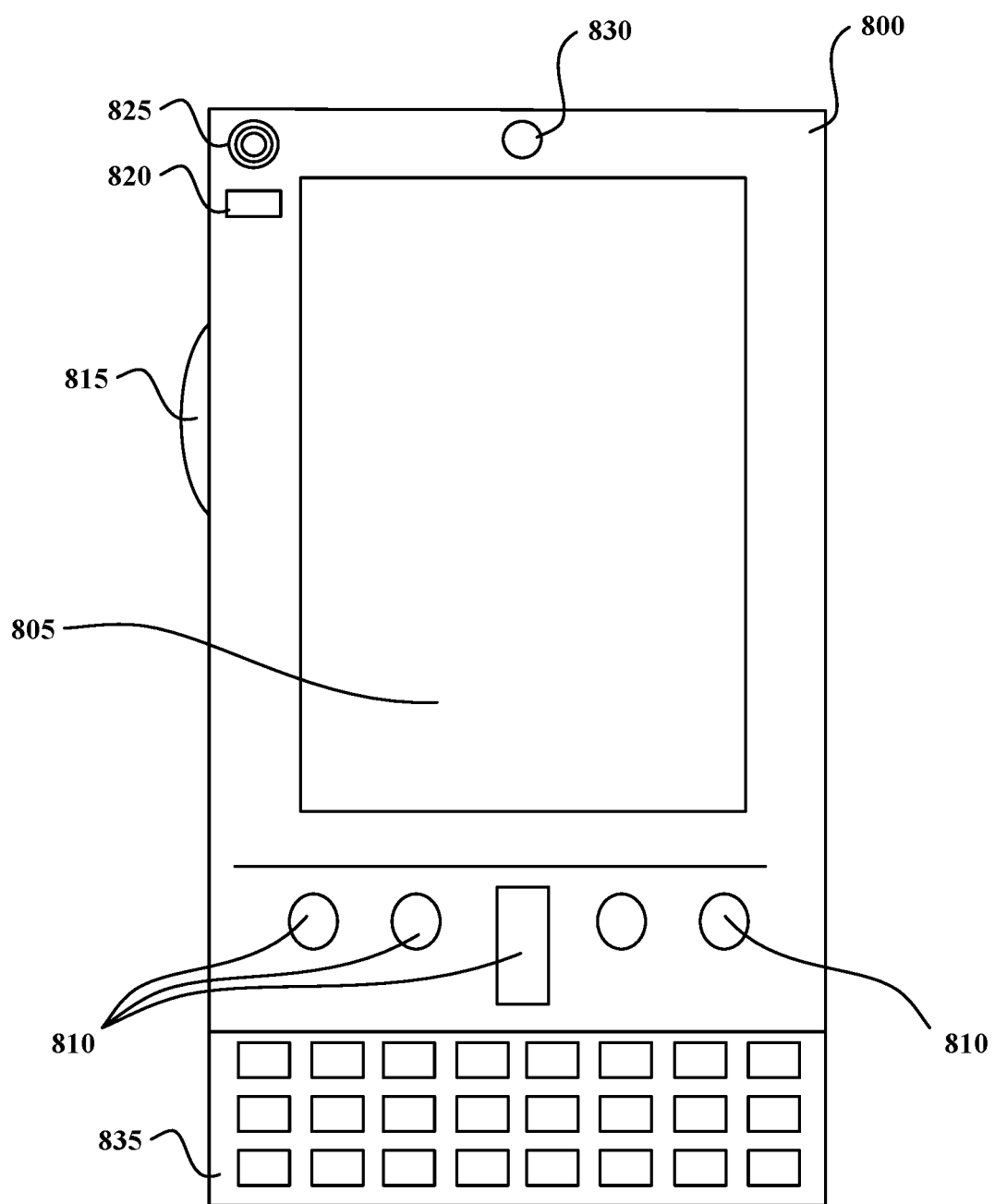
FIG. 8 illustrates a computing device for executing one more aspects of the present disclosure.
Figure 9:
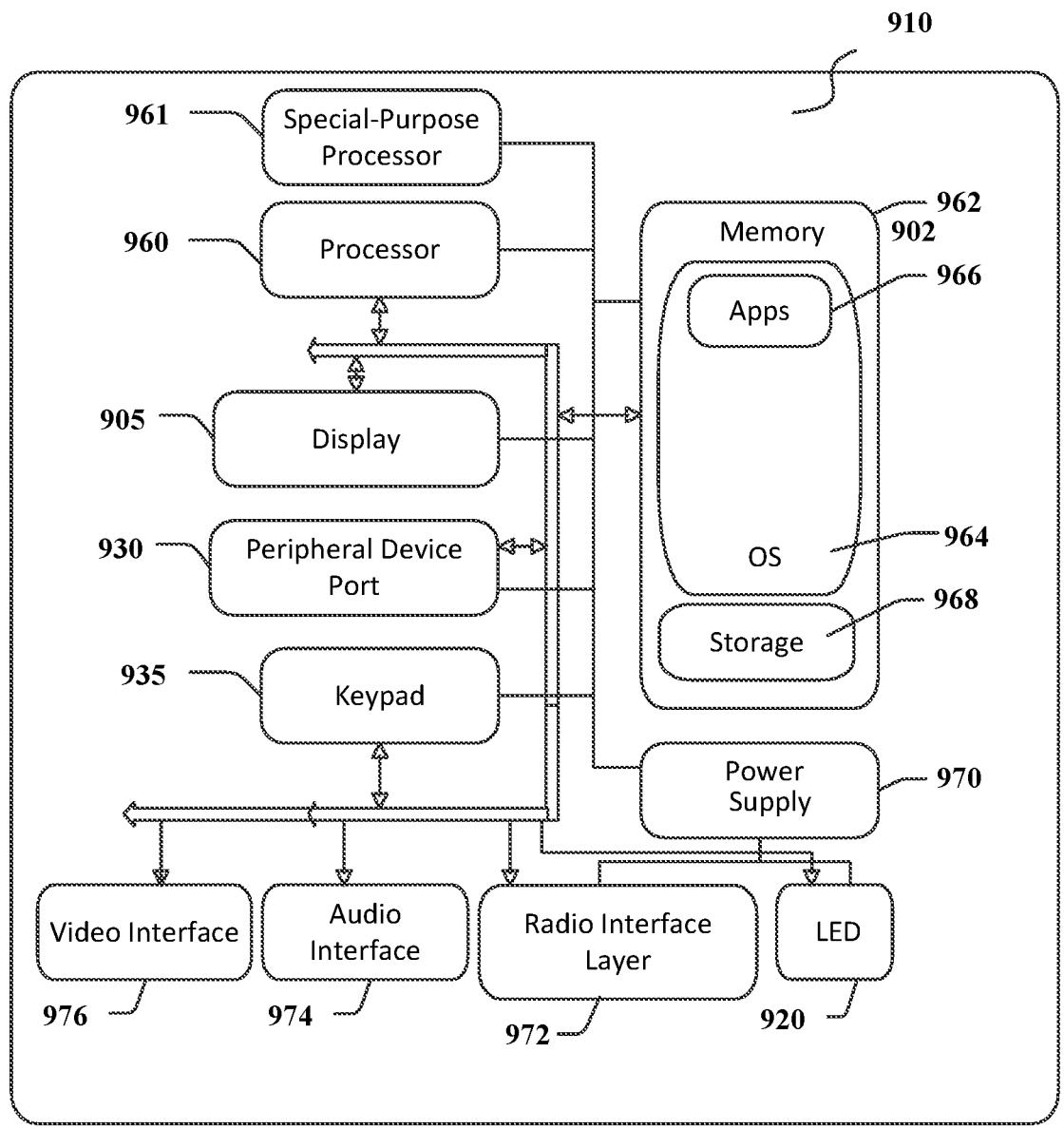
FIG. 9 is a simplified block diagram of a computing device with which aspects of the present disclosure may be practiced.

FIG. 8 and FIG. 9 illustrate computing device 800, for example, a mobile telephone, a smart phone, a tablet personal computer, a laptop computer, and the like, with which embodiments of the disclosure may be practiced. With reference to FIG. 8, an exemplary mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the computing device 800. The display 805 of the mobile computing device 800 may also function as an input device (e.g., a touch screen display). If included, an optional side input element 815 allows further user input. The side input element 815 may be a rotary switch, a button, or any other type of manual input element.

In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode) and/or an audio transducer 825 (e.g., a speaker). In some embodiments, the mobile computing device 800 incorporates a vibration transducer for providing the user with tactile feedback. In yet another embodiments, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In embodiments, the word processing application may be displayed on the display 805.

FIG. 9 is a block diagram illustrating the architecture of one embodiment of a mobile computing device. That is, the mobile computing device 900 can incorporate a system (i.e., an architecture) 902 to implement some aspects of the disclosure. In one aspect the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and a wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, diagramming applications, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored in the host computer. As should be appreciated, other applications may be loaded into the memory 962 and run on the mobile computing device 900, including steps and methods for providing personalized feedback from voice analysis and other user input.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the functions of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa. The radio 972 allows the system 902 to communicate with other computing devices such as over a network. The radio 972 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 902 provides notifications using the visual indicator 820 that can be used to provide visual notifications and/or an audio interface 974 producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968. Computer storage media may include volatile and nonvolatile, removable and non-removable media implemented in any method or technology for storage of information, such as computer readable instructions, data structures, program modules, or other data.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 902 may vary and may include more or fewer components than those described in FIG. 9. In some examples, interfacing between components of the system 902 may occur remotely, for example where components of system 902 may be spread across one or more devices of a distributed network. In examples, one or more data stores/storages or other memory are associated with system 902. For example, a component of system 902 may have one or more data storages/memories/stores associated therewith. Data associated with a component of system 902 may be stored thereon as well as processing operations/instructions executed by a component of system 902.

Figure 10:
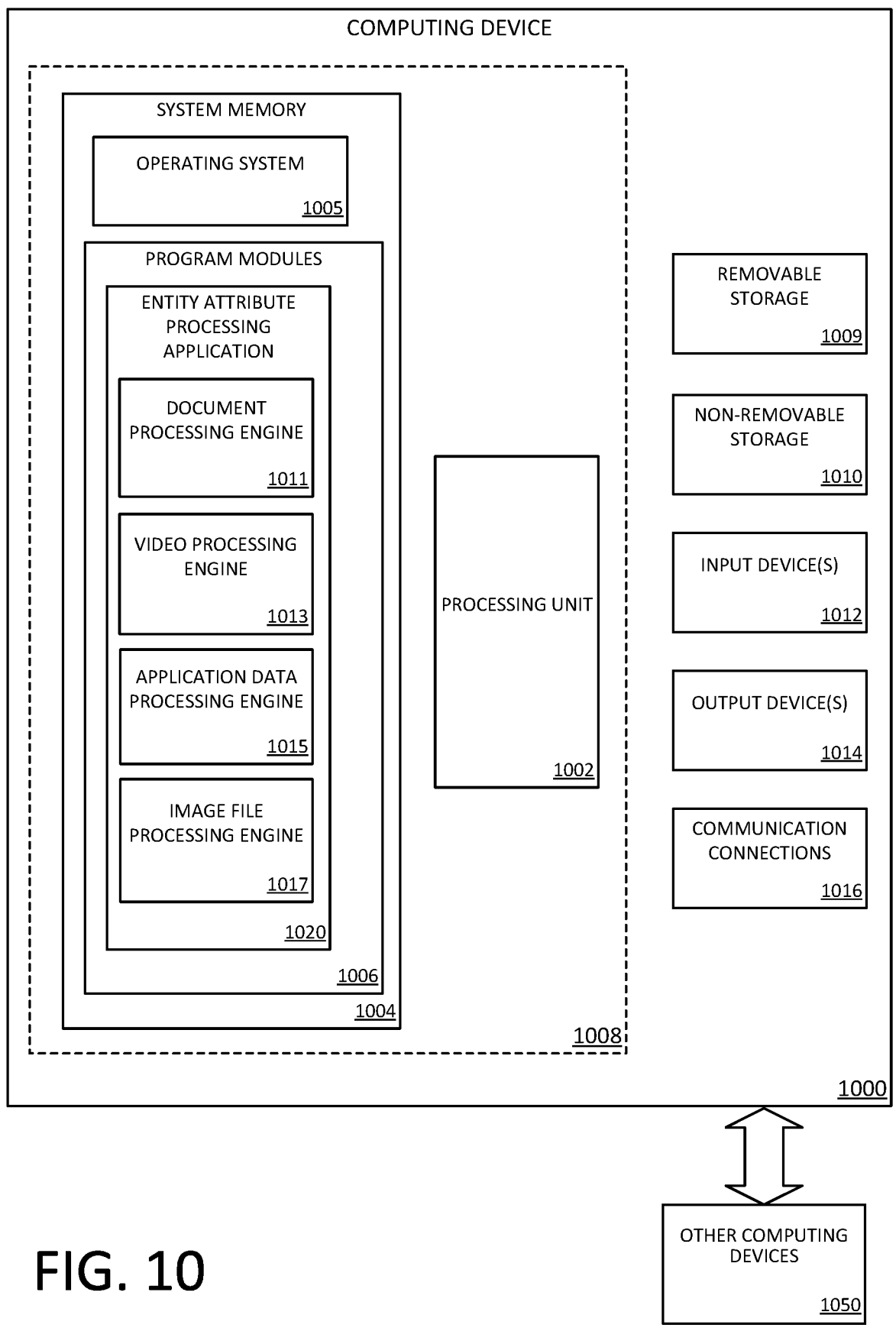
FIG. 10 is a block diagram illustrating physical components (e.g., hardware) of a computing device 1000 with which aspects of the present disclosure may be practiced.

FIG. 10 is a block diagram illustrating physical components (e.g., hardware) of a computing device 1000 with which aspects of the disclosure may be practiced. The computing device components described below may have computer executable instructions for inspecting data from each of a plurality of resources, wherein each of the plurality of resources comprises a plurality of properties; inspecting each of the plurality of properties for each of the plurality of resources and determining at least one entity attribute type for each of the plurality of resources based on a base classification model; associating at least one navigational attribute with each of the determined entity attribute types for the plurality of resources, the associating comprising a contextual classification analysis of the plurality of properties for each of the plurality of resources; and building a skeletal model for the federated graph based on the at least one determined entity attribute type and the at least one associated navigational attribute for each of the plurality of resources, the skeletal model defined by traversable relationships amongst the navigational attributes.

In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for entity attribute processing application 1020, such as one or more components in regards to FIG. 10 and, in particular, document processing engine 1011, video processing engine 1013, application data processing engine 1015 and image file processing engine 1017.

The operating system 1005, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., entity attribute processing application 1020) may perform processes including, but not limited to, the aspects, as described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 1004. While executing on processing unit 1002, program modules (e.g., applications, Input/Output (I/O) management, and other utilities) may perform processes including, but not limited to, one or more of the operational stages of the methods described herein.

Figure 11:
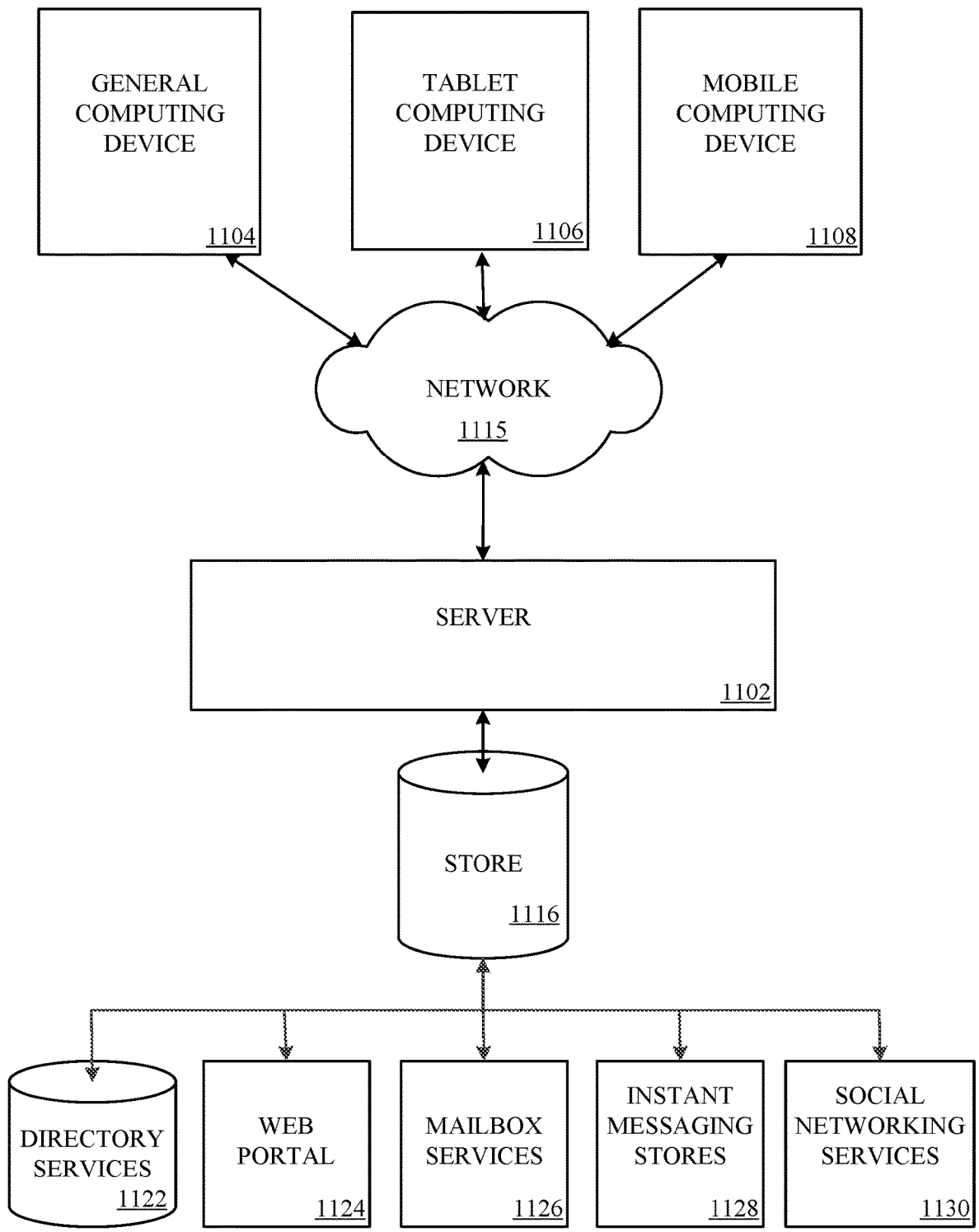
FIG. 11 is a schematic diagram illustrating an example distributed computing environment for dynamic entity model generation from graph data.

FIG. 11 illustrates one example of the architecture of a system for dynamically extending a federated graph as described herein. User input may be accessed, interacted with, or edited in association with programming modules 1006 and storage/memory which may be stored in different communication channels or other storage types. For example, various documents may be stored using a directory service 1122, a web portal 1124, a mailbox service 1126, an instant messaging store 1128, or a social networking site 1130, application 1006, an IO manager, other utilities and storage systems may use any of these types of systems or the like for enabling data utilization, as described herein. A server 1102 may provide a storage system for use by a client operating on a general computing device 1104 and mobile computing devices 1106 through network 1115. By way of example, network 1115 may comprise the Internet or any other type of local or wide area network, and client nodes may be implemented as a computing device embodied in a personal computer, a tablet computing device 1106, and/or by a mobile computing device 1108 (e.g., mobile processing device). Any of these examples of the computing devices described herein may obtain content from the store 1116.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for dynamically extending a federated graph, comprising:
   inspecting, by a processor, data from a resource that comprises at least a first property and a second property;
   determining whether there is an entity attribute type in the federated graph relating to the first property;
   based on determining that there is not an entity attribute type in the federated graph for the first property, generating, using machine learning, a new entity attribute type that did not previously exist in the federated graph; and
   generating at least one node in the federated graph for the resource, the at least one node comprising:
   the first property, wherein the first property is associated with the new entity attribute type in the node; and
   the second property, wherein the second property is associated with another entity attribute type in the node.

2. The method of claim 1, wherein the new entity attribute type is generated based on a syntax analysis of one or more properties of the resource.

3. The method of claim 1, wherein the new entity attribute type is generated based on a formatting analysis of one or more properties of the resource.

4. The method of claim 1, wherein the new entity attribute type is generated based on a received data type of the resource.

5. The method of claim 1, wherein the new entity attribute type is generated based on a base classification model that comprises one or more sets of rules associated with the federated graph.

6. The method of claim 5, wherein the one or more sets of rules include at least one customized rule for determining an entity attribute type for a resource based on a user-defined property designation.

7. The method of claim 1, further comprising:
   receiving a new resource;
   classifying a property associated with the new resource as the new entity attribute type; and
   associating the property of the new resource with the new entity attribute type.

8. The method of claim 7, further comprising creating at least one new traversable relationship in the federated graph corresponding to the property of the new resource.

9. The method of claim 1, further comprising:
receiving corrective input indicating that the determined new entity attribute type is incorrect; and
associating an alternate entity attribute type with the first property based on the corrective input.

10. The method of claim 1, wherein the another entity attribute type previously existed in the federated graph.

11. A computer storage medium comprising executable instructions that, when executed by a processor, assist with selectively managing document editing for an enterprise, the computer-readable storage device including instructions executable by the processor for:
inspecting data from a plurality of resources, wherein each of the plurality of resources comprises a plurality of properties;
determining, using machine learning, a first type for a first property and a second type for a second property, wherein the first property and the second property are associated with a resource of the plurality of resources;
associating, using a contextual classification analysis, the first property with the determined first type and the second property with the determined second type;
generating a skeletal model for a federated graph based on the determined types and properties of the resource;
receiving corrective input indicating that the determined first type is incorrect, wherein the corrective input comprises a corrective type for the determined first type, wherein the corrective input; and
associating the corrective type with the first property.

12. The computer storage medium of claim 11, wherein the contextual classification analysis comprises a syntax analysis of at least one of the first property or the second property of the resource.

13. The computer storage medium of claim 11, wherein the contextual classification analysis comprises a formatting analysis of at least one of the first property or the second property of the resource.

14. The computer storage medium of claim 11, wherein the contextual classification analysis is performed based on a received data type, the received data type selected from one of: a video data type, an image data type, and an audio data type.

15. The computer storage medium of claim 11, wherein generating the skeletal model further comprises generating at least one relationship corresponding to the first property of the resource.

16. The computer storage medium of claim 11, wherein the instructions are further executable by the processor for:
receiving a new resource;
classifying a property associated with the new resource as the corrective type; and
associating the property with the corrective type.

17. A system for dynamically extending a federated graph, comprising:
at least one processor; and
a memory storing instructions that, when executed by the at least one processor, causes the system to perform a set of operations, the set of operations comprising:
inspecting data from a resource that comprises at least a first property and a second property;
determining whether there is a type the property in a federated graph relating to the first property;
based on determining that there is not a type in the federated graph for the first property, generating, using machine learning, a new type that did not previously exist in the federated graph; and
generating at least one node in the federated graph for the resource, the at least one node comprising:
the first property, wherein the first property is associated with the new type in the node; and
the second property, wherein the second property is associated with another entity attribute type in the node.

18. The system of claim 17, wherein the new type is generated based on at least one of: a syntax analysis of one or more properties of the resource, and a formatting analysis of one or more properties of the resource.

19. The system of claim 17, wherein the new type is generated based on a data type of the resource.

20. The system of claim 17, wherein the set of operations further comprises:
receiving corrective input indicating that the determined type is incorrect; and
associating an alternate type with the first property based on the corrective input.

* * * * *